(12) United States Patent
Holcombe et al.

(10) Patent No.: US 6,235,253 B1
(45) Date of Patent: May 22, 2001

(54) RECOVERING VANADIUM OXIDES FROM PETROLEUM COKE BY MELTING

(75) Inventors: Thomas C. Holcombe, Neshanic Station, NJ (US); Donald P. Malone, Grayson, KY (US)

(73) Assignees: Marathon Ashland Petroleum, LLC, Finlay; Envires LLC, Miamisburg, both of OH (US)

( * ) Notice: Subject to any disclaimer, the term of this patent is extended or adjusted under 35 U.S.C. 154(b) by 0 days.

(21) Appl. No.: 09/324,333

(22) Filed: Jun. 2, 1999

Related U.S. Application Data

(60) Provisional application No. 60/088,581, filed on Jun. 9, 1998.

(51) Int. Cl.⁷ .......................... C22B 34/20; C22B 34/22; C22B 34/24
(52) U.S. Cl. ................................................. 423/62; 75/622
(58) Field of Search .................... 423/62, 138, DIG. 12; 75/500, 503, 507, 548, 622, 628, 958

(56) References Cited

U.S. PATENT DOCUMENTS

| | | |
|---|---|---|
| 4,071,355 | 1/1978 | Staggers . |
| 4,203,759 | 5/1980 | Metrailer et al. . |
| 4,243,639 | 1/1981 | Haas et al. . |
| 4,345,990 | 8/1982 | Fahlstrom et al. . |
| 4,443,415 | 4/1984 | Queneau et al. . |
| 4,708,819 | 11/1987 | Vasconcellos et al. . |
| 4,816,236 | 3/1989 | Gardner . |
| 4,957,544 * | 9/1990 | Najjar ..................................... 75/500 |
| 5,259,864 | 11/1993 | Greenwalt . |
| 5,277,795 | 1/1994 | Thornhill et al. . |
| 5,324,341 | 6/1994 | Nagel et al. . |
| 5,427,603 | 6/1995 | Samant et al. . |
| 5,484,544 | 1/1996 | Vuong et al. . |
| 5,772,726 * | 6/1998 | Woods et al. .......................... 75/622 |

* cited by examiner

*Primary Examiner*—Steven Bos
(74) *Attorney, Agent, or Firm*—Richard D. Stone

(57) ABSTRACT

A process for recovering and purifying vanadium found in petroleum coke is disclosed. Coke containing V and other metals such as Ni is charged to a molten metal bath and dissolved to form a molten metal bath with dissolved carbon, dissolved V metal and dissolved Ni. Oxygen containing gas is added in an amount sufficient to heat balance the process and produce off gas. At least periodically the conditions in the bed are made more severely oxidizing so that a portion of the molten vanadium metal is oxidized to form slag. Oxidation is limited so that a majority of the Ni dissolved in the bath remains as dissolved elemental Ni metal. Oxidized vanadium species are continuously or intermittently withdrawn from the slag layer, by dust formation or by tapping the slag layer.

14 Claims, 1 Drawing Sheet

RECOVERING VANADIUM OXIDES FROM PETROLEUM COKE BY MELTING

This application claim benefit of provisional application No. 60/088,581, Jun. 9, 1998.

Many refiners are now forced to process more difficult stocks, which are heavier and more metals contaminated. Many heavy crudes contain significant amounts of vanadium and sulfur and frequently with lesser amounts of Ni, Fe and other metal compounds.

Such heavy crudes are difficult to process catalytically, so an initial stage of thermal processing, usually some form of coking, is typically used to free distillable, relatively metals free products from vanadium containing coke. The coker gas oil and coker naphtha are essentially free of metals and may be processed by conventional catalytic upgrading processes to produce high quality transportation fuels and other hydrocarbon products. Unfortunately, coking of these difficult crudes produces large amount of coke, a solid product with an enhanced concentration of vanadium and sulfur and other metals present in the charge to the coker.

Many cokers produce coke which is so contaminated with metals and sulfur that it has little value as fuel. The sulfur generally precludes of coke in cement kilns. Such materials usually have enough vanadium to cause processing problems but too low a vanadium concentration to make vanadium recovery economically attractive.

Some coking processes, such as fluid bed cokers, especially those employing gasifiers, can produce large amounts of fine, low density coke particles which is especially difficult to treat using conventional technology.

To illustrate just how difficult it is to process vanadium rich cokes, some representative prior art processes are reviewed below.

U.S. Pat. No. 4,203,759, Metrailer et al, PROCESS FOR THE PREPARATION OF A VANADIUM-CONTAINING METALLIC ASH CONCENTRATE, taught heating partially gasified coke at relatively with oxygen containing gas to produce low density ash. Most ash particles produced had a diameter of less than 1 micron. The fine ash was readily processed with sulfuric acid to recover vanadium.

U.S. Pat. No. 4,243,639, Haas et al, METHOD FOR RECOVERING VANADIUM FROM PETROLEUM COKE, taught gasifying the coke with steam in the presence of an alkali metal salt to improve V recovery during subsequent processing steps.

U.S. Pat. No. 4,345,990, Fahlstrom et al, METHOD FOR RECOVERING OIL AND/OR GAS GROM CARBON-ACEOUS MATERIALS, taught use of two molten baths to process a variety of carbon containing wastes. A lead or zinc first bath operated at 500 C. to thermally devolatilize the carbonaceous material, while the second bath of molten iron operated at 1200 C. and operated with oxygen to gasify residual quantities of carbon.

U.S. Pat. No. 4,443,415, Queneau et al, RECOVERY OF V2O5 AND NICKEL VALUES FROM PETROLEUM COKE, taught slurrying coke in an aqueous solution of sodium carbonate to increase V recovery.

U.S. Pat. No. 4,708,819, Vasconcellos et al, REDUCTION OF VANADIUM IN RECYCLE PETROLEUM COKE, taught the problems of high vanadium levels during partial oxidation (the vanadium forms eutectics with refractory walls, melting them). The vanadium content of recycled, unconverted coke was reduced by froth flotation treatment.

U.S. Pat. No. 4,816,236 Gardner, RECOVERY OF VANADIUM AND NICKEL FROM PETROLEUM RESIDUES, taught recovering vanadium from various Flexicoke residues with varying V contents and particle sizes. The patent reported that Flexicoke from the heater bed had 1–5 wt % vanadium pentoxide, while coke from the cyclone venturi fines had 8–12 wt % vanadium pentoxide. Coke from the wet scrubber had as much as 20 wt % vanadium pentoxide. The patentee taught mixing coke with NaOH, burning and then leaching to recover vanadium. A majority of the Ni was reported to be left in the solids after the leach step.

U.S. Pat. No. 5,259,864, Greenwalt, METHOD OF DISPOSING OF ENVIRONMENTALLY UNDESIRABLE MATERIAL AND PROVIDING FUEL FOR AN IRON MAKE PROCESS E.G., PETROLEUM COKE, taught using a sulfur and heavy metal containing petroleum coke in a melter. The coke was mostly burned to form a fluidized bed of coke which was then reacted with ore and oxygen to make molten iron or steel preproducts. A slag layer contained sulfur freed during combustion of the petroleum coke.

U.S. Pat. No. 5,277,795, Thornhill et al, PROCESS AND APPARATUS FOR RECOVERING HEAVY METAL FROM CARBONACEOUS MATERIAL, taught burning petroleum coke to produce ash then processing the ash to extract metallic compounds.

U.S. Pat. No. 5,324,341, Nagel et al, METHOD FOR CHEMICALLY REDUCING METALS IN WASTE COMPOSITIONS, taught molten metal processing of metal containing wastes. Multiple reducing agents reduced oxygen-containing metals compounds in a metal-containing waste composition. Claim 24 mentioned use of an oxide of V as an oxidizing agent.

U.S. Pat. No. 5,427,603, Samant et al, METHOD OF TREATING A VANADIUM-CONTAINING RESIDUE, taught processing petroleum coke with air at 850 C. in a fluidized bed with an inert bed of granular iron oxide with an oxygen partial pressure between 10-4 bar and 10-6 bar to produce ash. The ash was then processed over a magnetic separator to recover the inert iron oxide for recycle.

U.S. Pat. No. 5,484,554 Vuoung et al, OXIDANT INJECTION FOR IMPROVED CONTROLLED OXIDATION, taught processing of coke in a partial oxidation reactor. The V in the coke forms a V rich slag in the reactor.

While not related directly to processing coke, U.S. Pat. No. 4,071,355, Staggers, RECOVERY OF VANADIUM FROM PIG IRON, taught removal of vanadium from pig iron to produce a vanadium rich slag by oxidizing molten pig iron at 2600–2900 F.

The teachings of these patents, which are incorporated by reference, could be summarized as follows.

Vanadium in petroleum containing coke is difficult to recover directly, that is, from the coke, because it is in a form which does not lend itself to conventional leaching approaches. The carbon, probably present in the form of condensed chelating structures, effectively shields significant portions of the metal from conventional leaching solutions. Vanadium in coke can be recovered much more readily after combustion, because the vanadium in the ash produced is more susceptible to leaching, though even here some treatment, such as with sodium carbonate or sodium hydroxide was needed to improve metal recovery during leaching.

Vanadium is usually found in combination with Ni, and sometimes other metals, present in the petroleum, and separation of V values from Ni values presents a significant problem.

We wanted to develop a more direct and efficient method of recovering a relatively pure vanadium product from petroleum coke containing V and other metals such as Ni.

We discovered that a molten metal process, originally developed to produce high purity hydrogen or synthesis gas from various waste streams, could be modified to process vanadium containing coke, dissolve the vanadium in its metallic state into the iron bath to form a molten metal mixture of Ni, Fe, V and perhaps other metals. We then selectively oxidized the vanadium at conditions which selectively and preferentially oxidized V in the bath to form oxidized vanadia species which separated from the iron bath as a slag layer, leaving the Ni behind. The separation was not perfect in terms of eliminating Ni, but the vanadium oxide layer was a greatly purified material as compared to the material which originally formed by dissolving the coke in the molten metal bath.

Details of the basics or a preferred molten metal process are disclosed in one or more of the following patents, which are incorporated by reference.

U.S. Pat. No. 5,755,839, MOLTEN METAL REACTOR SWING SYSTEM AND PROCESS

U.S. Pat. No. 5,645,615, MOLTEN DECOMPOSITION APPARATUS AND PROCESS.

U.S. Pat. No. 5,577,346 MULTI-ZONE MOLTEN-METAL HYDROGEN AND FUEL GAS GENERATION PROCESS

U.S. Pat. No. 5,435,814, MOLTEN METAL DECOMPOSITION APPARATUS.

The process defined by the above four patents could tolerate a great many feeds, including coal and trash, but was primarily directed to production of relatively pure hydrogen gas at superatmospheric pressure. This work was not directed toward vanadium recovery from petroleum coke, ignored the problem of multi-metallic coke, and did not suggest use of selective oxidation, after dissolving metal values into the molten metal bath, to selectively recover oxidized vanadium.

This is in contrast to the prior work on vanadium recovery from petroleum coke which generally involved burning the coke to form ash, or treating the coke with alkali metal to improve subsequent leaching steps.

Our process used a special form of molten metal processing to dissolve the carbon and vanadium/nickel species present in the coke. The carbon, probably present in the form of a collapsed metalo-porphyrin surrounding an atom of vanadium metal, dissolved readily in the molten iron bath, freeing the vanadium and permitting rapid and complete dissolution of the vanadium and other metals found in the petroleum coke in the molten iron bath. The net production of vanadium was then continuously or intermittently removed from the bath by selective oxidation to produce a "slag" product highly enriched in oxidized vanadium.

The process was fast and simple—no special processing of the coke was needed. The coke could be dry, but the process tolerated well, and even benefited from, the use of coke containing some water. Heat/utility requirements were low, in fact the worse the feed in terms of % V in the coke, the more heat the process generated. The process was tolerant of many other impurities found in coke containing feed, such as Ni and S compounds.

BRIEF SUMMARY OF THE INVENTION

Accordingly, the present invention provides a method of recovering and purifying vanadium from coke or heavy hydrocarbons containing vanadium and other metals which are considered impurities comprising dissolving coke or heavy hydrocarbon containing both V and at least one other metal, such as Ni in a molten metal bath, preferably a molten iron bath to produce a molten metal bath containing dissolved carbon and dissolved vanadium metal and dissolved Ni metal, exothermically oxidizing at least a majority of the net amount of carbon dissolved in said bath to produce carbon oxides and maintain said bath in a molten state and at least periodically, increasing the amount of oxygen addition, or controlling the amount of carbon present in said bath, to create oxidizing conditions sufficient to selectively oxidize said dissolved vanadium at a greater rate than said dissolved Ni or said molten iron and produce oxidized vanadium species which formed a slag layer on tope of said bath and at least periodically, removing said oxidized vanadium species from said bath.

The vanadium oxidation may be continuous. In this mode of operating, conditions in the bath are maintained to rapidly dissolve metal species in the coke and selectively oxidize vanadium species. Carbon levels will usually be below 1 wt %, and preferably below 0.5 wt %. Vanadium and other feed metals are rapidly dissolved and the vanadium is preferentially oxidized.

While the process can operate continuously, for maximum purification of vanadium the bath is preferably maintained in a relatively reducing mode of operation, so that little of the vanadium is oxidized. The vanadium level is allowed to increase until the bath contains 5 wt % or 10 wt % V, more preferably at least 20 wt % V, and most preferably 40 wt % V, after which conditions are shifted in the bath to promote oxidation of vanadium. This can be done by intermittently stopping addition of coke and/or increasing the addition of oxygen or oxygen containing gas until the desired amount of vanadium has been oxidized and removed from the molten iron bath as a slag product.

The bath may be continuously or intermittently replenished with fresh iron. In preferred embodiments, the bath is run at superatmospheric pressure, preferably 2 to 200 atm. High pressure operation allows higher feedstock rates without excessive carryover of dust. Higher pressures also increase the rate at which carbon in feedstock dissolves in the molten metal bath.

Presence of large amounts of carbon in the bath (i.e., reducing conditions) permits processing of sulfur rich coke with much or essentially all of the sulfur content released as H2S, which can be readily processed in a refinery Claus unit or other H2S recovery process. If an oxidizing bath is used more of the sulfur will be released as oxides of sulfur which may require sulfur capture with conventional slag forming agents or stack gas processing.

When desired, multiple zone processing of the coke, alone or admixed with a hydrocarbon, may be practiced to permit recovery of a relatively pure hydrogen stream. Our process is generic as to the bath used. Circulating baths, pressurized single zone baths, multiple zone baths, and the like can all be used. Thus while a high pressure design, such as that developed by Ashland and disclosed in the above four patents discussed above which were assigned to Ashland, it is also possible to use other molten metal bath designs such as the Molten Metal Technology reactor or other molten bath designs now existing or hereafter developed.

DETAILED DESCRIPTION OF PREFERRED EMBODIMENTS

Figure 1:
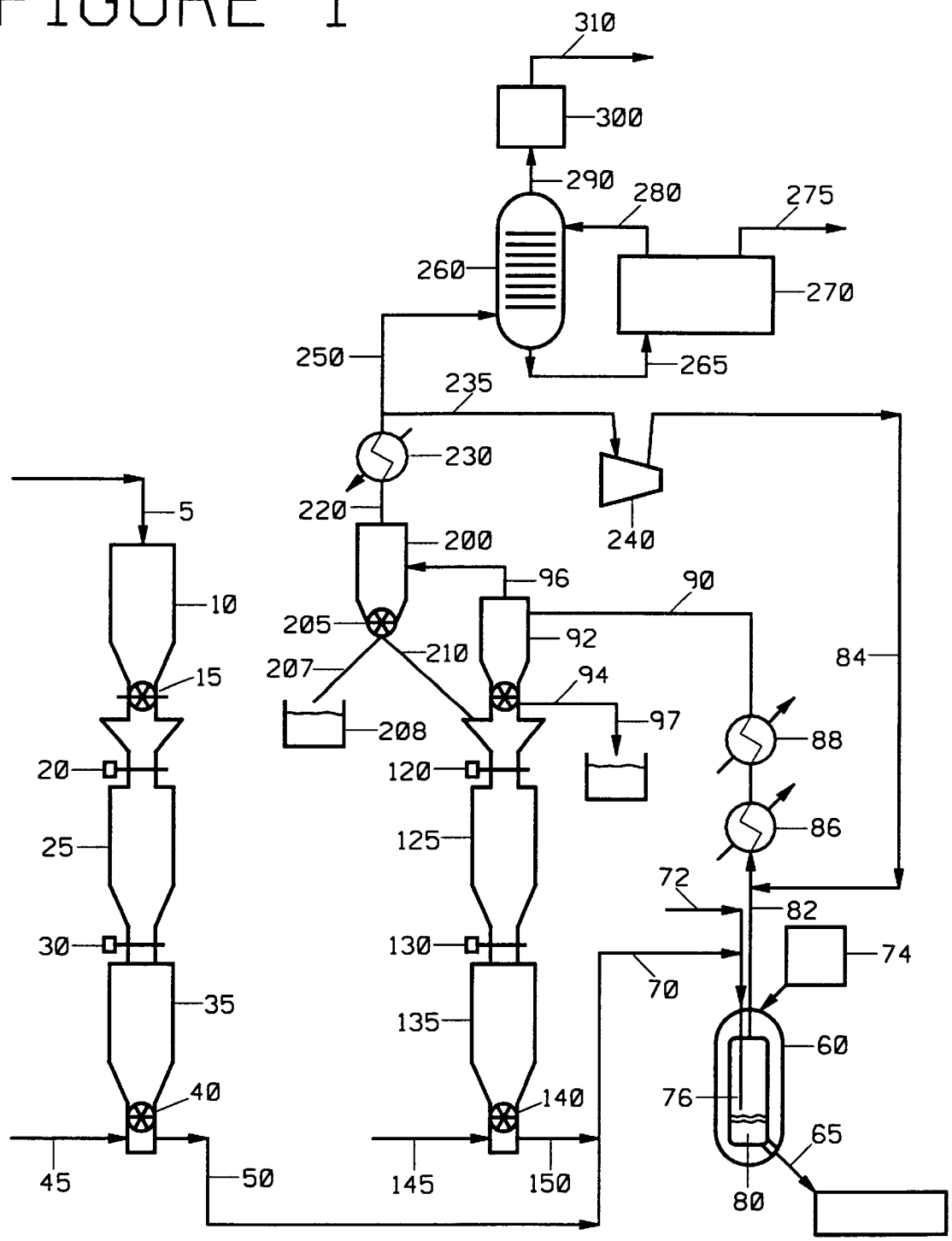
FIG. 1 is a simplified schematic drawing of a preferred embodiment wherein vanadium containing coke is processed in a molten metal reactor to produce vanadium containing slag as the primary vanadium product.

The petroleum coke feedstock may be any metal containing coke. Usually the coke will contain vanadium, nickel, and sulfur. Such materials are well known and widely available, they are produced wherever coking is used as an upgrading step for heavy Venezuelan crudes.

The coke may be sponge coke from a delayed coker, shot coke, fines from fluid coker, and the like. Some fluidized coking units partially burn some of the coke, yielding a coke product of enhanced vanadium concentration but generally still classified as coke despite the oxidative treatment.

In addition to coke, the feed may also comprise, or consist essentially of, liquid hydrocarbons. Thus the process may be used to process Venezuelan or other crudes which are contaminated with vanadium, or liquid or semi-solid fractions derived from such crudes.

PROCESS DESCRIPTION

Referring to the FIGURE, a coke feed, typically a fine particulate feed having an average particle size less than 80 microns or even much smaller, is charged via line 5 to feed hopper 10. Coke is discharged via rotary valve 15 through open swing valve 20 into upper hopper 25. Coke is discharged down through swing valve 30 into pressurized hopper 35, from which it is continuously or intermittently discharged via rotary valve 40 into a flowing stream of steam from line 45. Other fluids may be used besides steam, but steam is preferred due to its ready availability and relative safety. The steam/coke mixture flows through line 50, is mixed with a preferred but optional recycle fines stream from line 150, and charged via line 70 into the HyMelt reactor 60. The coke/steam mixture is preferably discharged down via outlet 76 towards molten metal bath 80. Preferably the nozzle is close enough to the surface of metal bath 80 and is discharged with sufficient force to penetrate the metal bath.

Oxygen or oxygen containing gas is preferably co-fed with the coke. This allows a significant amount of preheating of the coke during its passage through the piping to nozzle outlet 76. A stream of oxidized-vanadium may be continuously or intermittently withdrawn via line 65 as a product of the process. The process may also run with essentially all of the vanadium production being accumulated in the bed in the form of elemental vanadium metal along with dissolved elemental Ni, and the accumulated vanadium periodically removed by shifting the bed to more oxidizing conditions to form a V2O5 slag layer which may be removed in the form of "dust" or may be separately tapped and drawn off by means not show.

Off gas and entrained droplets of iron/vanadium and/or perhaps some slag droplets are removed via line 82, quenched with relatively cool recycle gas from recycle gas line 84 and charged successively through heat exchanger 86 which produces high pressure steam and heat exchanger 88 which produces lower pressure steam. The temperature of the material withdrawn from reactor 60 is typically around 2800 F., while the temperature of the withdrawn vapor is reduced to 1000 F. and 350 F. respectively by passage through exchangers 86 and 88.

The reactor off gas and entrained solids are charged to cyclone 92 which recovers a low particulate vapor via vapor outlet line 96. A solids rich, dense phase fluidized phase is discharged via rotary valve 94, though the cyclone solids rich phase outlet may be sealed by other conventional means such as a flapper valve or immersion of the cyclone dipleg in a dense phase fluidized bed of particulates. The cyclone vapor phase is charged via line 96 to bag filter 200, which may be a conventional bag house or other gas/particulate separation means such as a third stage separator, electrostatic precipitator, or the like. A solids phase is continuously or intermittently removed via rotary valve 205 and charged via line 210 to admix with the cyclone 92 solids phase and pass via swing valve 120 into hopper 125 and swing valve 130 into recycle fines pressurized hopper 135. Pressurized fines are discharged via rotary valve 140 into flowing steam in line 145 to be recycled, with fresh fluidized coke feed, via line 70 to the HyMelt reactor.

A portion of the net addition of V to the molten metal bath may be withdrawn as either a coarse dust product from the cyclone separator via line 94 and collection means 98 or as a finer dust product from the bag house via line 207 and collection means 208. The relatively particulate free vapor withdrawn via line 220 from bag filter means 200 may be further cooled using fin fan coolers, heat exchange with other process streams, or cooling water in cooler 230 to produce cooled vapor. A portion of cooled vapor is charged via line 235 to the inlet of recycle gas compressor 240 which discharges compressed recycle gas via line 84 to serve as quench stream. The remainder of the particulate free vapor is preferably charged through acid gas scrubber 260. Lean solvent in line 280 from solvent regenerator 270 is charged to an upper portion of the scrubber to contact acid gas. A relatively sweet gas stream is withdrawn via line 290 and charged via line 300 into ZnO treater 300 or equivalent clean up means to produce a purified gas stream which may be used as fuel or as a hydrogen rich syngas removed via line 310.

The rich solvent, with absorbed acid gas species, is removed via line 265 and recycled to solvent regenerator 270 which preferably recovers at least a portion of absorbed acidic sulfur containing gas species as H2S, which may be converted into elemental sulfur via a conventional Claus unit, not shown.

A good way to maintain reducing conditions, during vanadium + other metal accumulation, is to operate the bath under reducing conditions, with more than 0.5 wt % carbon, preferably more than 1.0 wt % carbon, and more preferably with more than 2 or 3 wt %, and most preferably with more than 4 wt % carbon. This is especially beneficial when the feed contains large amounts of sulfur which would otherwise contaminate the iron and/or vanadium product. After sufficient vanadium has accumulated, the bed can be shifted to oxidizing conditions which will preferentially oxidize vanadium, leaving other metal components such as Ni and Fe in the bath. It is possible to remove most, or essentially all, of the V entering the process as oxidized vanadium slag. This minimizes the amount of material produced by the process in that the major product is a highly concentrated vanadium oxide material.

The cyclic approach, with a long period of operation with reducing conditions and a shorter period of oxidation to generate slag, also lends itself to high pressure operation during vanadium accumulation and low pressure or atmospheric pressure operation during slag formation/withdrawal. This allows the reactor to produce valuable syngas or even hydrogen during vanadium accumulation, with high pressure operation minimizing dust formation. High pressure may even be maintained during at least the initial portions of the carbon burn/vanadium oxidation portion, to minimize dust formation, with low pressure operation only for the final stages (where it is desired to remove the slag as dust) or to facilitate slag removal.

We claim:

1. Recovering an oxidized vanadium product from a coke comprising carbon and vanadium by a process comprising:
dissolving said coke in a molten metal bath to produce a molten metal bath containing dissolved carbon, dissolved vanadium metal and dissolved other metal;

oxidizing at least a portion of the dissolved carbon in said molten metal bath by adding oxygen containing gas to produce heat and a carbon oxide containing off gas;

oxidizing, at least periodically, dissolved vanadium metal in said molten metal bath by adding oxygen containing gas in an amount sufficient to create vanadium oxidizing conditions in said molten metal bath which oxidize at least a portion of said dissolved vanadium metal to form oxidized vanadium which floats to the top of said molten metal bath to form a slag layer; and intermittently or continuously withdrawing oxidized vanadium as a product of the process.

2. The process of claim 1 wherein said coke is a petroleum coke containing both vanadium and nickel, said coke is added for a time sufficient to accumulate in said molten metal bath at least 10 wt % dissolved vanadium metal, on an elemental metal basis, and vanadium oxidizing conditions are created in said molten metal bath which preferentially oxidize said dissolved metallic vanadium so that the atomic ratio of vanadium/nickel in the slag produced by said vanadium oxidation conditions is greater than the ratio of vanadium/nickel in the molten metal bath.

3. The process of claim 2 wherein the molten metal bath contains at least 20 wt % vanadium.

4. The process of claim 2 wherein the molten metal bath contains at least 40 wt % vanadium.

5. The process of claim 1 wherein said molten metal bath is operated a majority of the time at reducing conditions sufficient to maintain vanadium as dissolved elemental metal and is operated a minority of the time at oxidizing conditions sufficient to produce vanadium pentoxide.

6. The process of claim 1 wherein production of carbon oxides gas in said molten metal bath entrains droplets of slag and at least a portion of the oxidized vanadium is continuously or intermittently withdrawn as dust from said slag layer.

7. The process of claim 1 wherein oxidized vanadium is withdrawn, at least periodically, by tapping said slag layer on top of said molten metal bath.

8. The process of claim 1 wherein oxidized vanadium is continuously withdrawn by tapping said slag layer on top of said molten metal bath.

9. The process of claim 1 wherein said molten metal bath is a molten iron bath.

10. The process of claim 1 wherein said coke is petroleum coke.

11. A process for producing an oxidized vanadium product from a carbon, nickel and vanadium containing petroleum coke comprising:

endothermically dissolving said coke in a molten metal bath to cool said bath under reducing conditions sufficient to produce a molten metal bath containing dissolved elemental vanadium metal, dissolved elemental metal nickel and dissolved carbon;

exothermically oxidizing, at coke oxidation conditions, at least a portion of dissolved carbon by adding oxygen containing gas to said molten metal bath to re-heat said bath and form a heated molten metal bath, said coke oxidation conditions including the presence of at least 1 wt % dissolved carbon and sufficient to maintain conditions which permit said vanadium metal to remain dissolved in said bath as an elemental metal while dissolved carbon is oxidized;

repeating said endothermic dissolving of coke and exothermic oxidizing of dissolved carbon to increase the concentration of dissolved vanadium metal in said molten metal bath to 5 wt % vanadium, on an elemental metal basis periodically adding sufficient oxygen containing gas to said heated molten metal bath to oxidize at least a majority of the dissolved vanadium metal, to vanadium pentoxide which forms a slag layer on top of said molten metal bath, and to leave at least a majority of the dissolved nickel as elemental metal which remains dissolved in said molten metal bath; and at least periodically withdrawing slag containing vanadium pentoxide as a product of the process.

12. The process of claim 11 wherein the bath is a molten iron bath.

13. The process of claim 11 wherein the during periods of vanadium dissolution the bath contains at least 1 wt % carbon.

14. The process of claim 11 wherein the during periods of vanadium dissolution the bath contains at least 4 wt % carbon.

* * * * *